United States Patent [19]

Russ et al.

[11] 4,130,627

[45] Dec. 19, 1978

[54] PROCESS FOR RECOVERING MINERAL VALUES FROM FLY ASH

[76] Inventors: James J. Russ, 1702 Tamarack La., Germantown, Tenn. 38138; James S. Russ, 504 Glen Arden Pl., Pittsburgh, Pa. 15208; Richard T. Heagy, 1877 Brierbrook Rd., Germantown, Tenn. 38138

[21] Appl. No.: 807,807

[22] Filed: Jun. 20, 1977

[51] Int. Cl.² ........................... C01F 7/02; C25C 1/06
[52] U.S. Cl. .................................... 423/127; 204/113; 423/339
[58] Field of Search ................ 204/113; 423/339, 132, 423/150, 629, 127

[56] References Cited

U.S. PATENT DOCUMENTS

| | | | |
|---|---|---|---|
| 1,420,130 | 6/1922 | Moxham | 204/113 |
| 1,444,887 | 2/1923 | Schwiete | 204/113 |
| 1,752,348 | 4/1930 | Levy | 204/113 |

FOREIGN PATENT DOCUMENTS 448107  5/1936  United Kingdom ..................... 423/127

OTHER PUBLICATIONS

Jacobson, Encyclopedia of Chemical Reactions, Reinhold Publishing Company, vol. I, (1946), p. 80.

Primary Examiner—O. R. Vertiz
Assistant Examiner—Wayne A. Langel
Attorney, Agent, or Firm—Elwood S. Kendrick; Patrick F. Bright

[57] ABSTRACT

A process for recovering mineral values from fly ash in commercial quantities comprising forming an alkaline aqueous fly ash blend, filtering the alkaline aqueous fly ash blend and recovering a solids blend therefrom, leaching the solids blend with hydrochloric or hydrofluoric acid to form dissolved chloride or fluoride salts of iron, aluminum and other metals, electrolyzing the dissolved chloride or fluoride salt solution to plate out at least iron, and, optionally, one or more other metals, recovering silicon dioxide as a precipitate from the leaching solution, and recovering the leaching solution free of silicon dioxide. Neutralizing the leaching solution in a certain pH range permits precipitation and recovery of aluminum hydroxide as a solid. The hydroxide may then be converted to alum or alumina by conventional methods.

11 Claims, No Drawings

PROCESS FOR RECOVERING MINERAL VALUES FROM FLY ASH

This invention relates to a method for separating and recovering in commercial quantities the mineral values in fly ash.

As used herein, the term "fly ash" refers to a mixture of particulates generated in the combustion of coal and, customarily, collected in smoke stacks using such collection devices as mechanical and electrostatic precipitators. Typically, the mineral values in fly ash include silicon dioxide, aluminum oxide, and iron oxide, and may include lesser amounts of oxides of such metals as copper, cobalt, magnesium, manganese, potassium, sodium, titanium, calcium and others. Until now, fly ash has been regarded as low value material useful only for making bricks, other low value building materials, cement, road surfacing materials, and agricultural products.

This invention relates to a process for separating the mineral values in fly ash from one another and for recovering these mineral values in commercial quantities in high yield and substantial purity. The following U.S. patents disclose various metal and mineral value recovery techniques, but none discloses the process of this invention: Nos. 179,658; 300,950; 2,185,858; 2,561,222; 2,578,898; 2,596,307; 3,260,660; 3,617,456; 3,649,487; 3,707,448; 3,725,266; 3,788,958; 3,793,172; 3,886,055; 3,900,375; and 3,912,603.

The process of this invention, a process for recovering mineral values in substantial yield and purity from fly ash, comprises:

(a) blending and heating fly ash with water at a pH in the range of about 11 to about 14, preferably about 11.5 to about 13.5, until the grain boundaries in the fly ash are substantially weakened;

(b) filtering the alkaline aqueous fly ash blend produced in step (a) and recovering a solids blend therefrom;

(c) leaching the solids blend recovered in step (b) with hydrochloric or hydrofluoric acid to form dissolved chloride or fluoride salts, respectively, of iron, aluminum, and the other metals present in the solids blend from step (b);

(d) electrolyzing the dissolved chloride or fluoride salts formed in step (c) to plate out at least iron, and, optionally, one or more other metals; and (e) separating silicon dioxide as a precipitate from the electrolyzed solution of step (d), and thereafter recovering the electrolyzed solution free of silicon dioxide. The silicon dioxide-free electrolyzed solution may then optionally be neutralized to a pH in the range of about 6 to about 8, preferably about 6.5 to about 7.5, with an alkaline substance to form an aluminum salt precipitate such as aluminum hydroxide in high yield and substantial purity. The alkaline chloride or fluoride concomitantly formed may then be reconverted to an alkaline reagent for reuse in this process.

In step (a) of this process, dissolution of fly ash must be minimized. Those substances that tend to agglomerate fly ash and make fly ash resistant to acid attack must be broken or at least substantially weakened, facilitating subsequent solubilization and recovery of the mineral values in the fly ash. During step (a), therefore, blending and heating should cease when dissolution of fly ash becomes measurable. Onset of dissolution may be determined by periodically analyzing a sample of the aqueous alkaline fly ash blend.

During step (a), the temperature is preferably in the range of about 90° C. to about 135° C., the pH, in the range of about 11 to about 14, preferably in the range of about 11.5 to about 13.5; the concentration of base such as sodium hydroxide, in the range of about 10% to about 30%, where its presence is needed to adjust pH, and the pressure is preferably ambient.

After step (a) is complete, which typically occurs within one hour, and more commonly within less than a half hour, the alkaline aqueous fly ash blend from step (a) is filtered and a solids blend is received. The filtering is effected without changing the temperature, pH or concentration of the solution, and the filtrate may be recovered and recycled to step (a) of the process. Filtering may be effected by means of a rotary vacuum/roll discharge/drum filter which discharges onto a conveyor belt for transport of the solids blend to step (c) of the process.

The solids blend recovered in step (b) is next dissolved [step (c)] in an aqueous leaching media that includes hydrofluoric acid or hydrochloric acid, but preferably includes hydrochloric acid. The hydrochloric acid solubilizes the metal values from the fly ash solids, including in particular, iron and aluminum, but also including all other metal values present such as magnesium, cobalt, copper, titanium, and precious metal such as silver. During this step, the temperature of the aqueous acid leaching media is preferably in the range of about 70° C. to about 90° C.; the pH, in the range of about 1 to about 2.5; and the concentration of acid in the media, in the range of about 10% to about 20% by weight. Large excesses of acid need not be used because rather complete solubilization of the metal values occurs with the use of stoichiometric equivalents of acid based on the kinds and relative quantities of metals present in the fly ash.

After solubilization of the metal values in aqueous acid leaching media is completely effected, the leaching solution is electrolyzed [step (d)], preferably using a commercial-type carbon anode equipped with titanium hangers. For iron, the cathode is also of a carbon type conventionally used for electrolysis of iron. Except for the plating of iron, the cathode is made of the metals to be plated from the solution. The pH, temperature, voltage and amperages used for electrolysis depend upon the nature of the metal(s) to be recovered. Thus, for example, where iron is the principal constituent to be recovered by electrolysis, the temperature is preferably in the range of about 50° C. to about 90° C.; the pH, in the range of about 1 to about 3; the voltage, in the range of about 1 to about 3 volts; and the amperage, in the range of about 1.2 to about 1.5 amps per square inch of electrode. Electrolysis proceeds smoothly and rapidly, and, where iron is the only metal to be plated, is usually completely effected in less than about 1 hour. Plating is effected at constant amperage and with gradually increasing voltage. When the voltage reaches about 3, plating automatically ceases, signalling the end of step (d).

During step (d), silicon dioxide precipitates to the bottom of the container holding the solution being electrolyzed, and is separated from that solution, dried and recovered. Thereafter, the electrolyzed solution, free of silicon dioxide, may optionally be treated with an alkaline reagent such as the hydroxides of alkali and alkaline earth metals to form aluminum hydroxide which precipitates in the pH range of about 6 to about 8 and is readily separated and recovered in high yield and purity.

The preferred alkaline reagents are ammonium hydroxide and sodium hydroxide, and the formation of an aluminum hydroxide precipitate is best effected at temperatures in the range of about 50° to about 90° C., and a pH in the range of about 6 to about 8, preferably about 6.5 to about 7.3. The quantity of hydroxide necessary is that required to change the acid pH of the electrolyzed solution to a pH in the range of about 6 to about 8, plus the amount required to form the hydroxide of aluminum. More specifically, about 0.9 pound of ammonium hydroxide, and about 1 to about 1.3 pounds of sodium hydroxide, respectively, are required to convert one pound of aluminum chloride to aluminum hydroxide in the pH range of 6-8.

Where ammonium hydroxide is the alkaline reagent used to form aluminum hydroxide from aluminum chloride or aluminum fluoride, the formation of the hydroxide also produces ammonium chloride. The chloride may be treated with a substance such as calcium oxide to reform the hydroxide, and the hydroxide may then be recycled to the formation of aluminum hydroxide. Generally, the use of sodium hydroxide to form aluminum hydroxide also produces sodium chloride, which may be electrolyzed to reform sodium hydroxide and recycled.

Apart from the rather surprising discovery that mineral values may be recovered in high yield and purity and in commercial quantities from fly ash, this invention solves a serious pollution problem by obviating the need to dispose of the fly ash, which is produced daily at the rate of hundreds of thousands of pounds. Preliminary indications are that the cost of building a plant to carry out the process of this invention, when added to the cost of processing fly ash, including the costs of fly ash, acids, bases, and energy consumed, is far less than the value of the products recovered from the process, even where the plant cost is amortized over a short life span.

EXAMPLE

Ten pounds of fly ash were obtained from the TVA power generating plant at Bull Run, Tennessee, where coal is used as a fuel to provide energy. Upon analysis, this ash was found to contain the following percentages by weight of the following mineral values:

| Substances | Percentage by Weight |
|---|---|
| Silicon dioxide | 52.8 |
| Iron oxide | 9.9 |
| Aluminum oxide | 26.2 |
| Others | 11.1 |
|  | 100.0 |

This Bull Run ash was found to have a pH of about 6.7. Accordingly, the ash was blended with a sufficient volume of water and sodium hydroxide in a beaker to create a solution containing about 10% by weight sodium hydroxide and with a pH of about 13.5. Blending was effected on a hotplate at a temperature of about 90° C. using a magnetic stirrer. Because sampling showed that the ash was dissolving in the alkaline aqueous media after 20 minutes of heating and blending, blending was then discontinued, and the alkaline aqueous solids blend was conveyed through a pump filter to separate a solids blend therefrom.

Of the ten pounds of fly ash fed to the tank, about 9.7 pounds were recovered as a solids blend from the filtrate. The filtrate was analyzed and found to have a pH of about 13.5, indicating only a trace loss of sodium hydroxide in step (a) of this process. The filtrate was not recovered, but would be recovered and recycled in a commercial process because little sodium hydroxide is consumed in this step.

The filtrate was then placed in a beaker containing about 10 pounds of hydrochloric acid with sufficient water to make a 10% hydrochloric acid solution by weight. The solids blend was mixed with the acid to solubilize all of the minerals in the fly ash except for silicon dioxide. In this step, the pH of the leaching solution was about 1.2, and the temperature was about 90° C.

Carbon anodes and cathodes on titanium hangers were placed in the solution, together with cathodes made of copper, titanium and magnesium. The mixture was stirred continuously by means of a magnetic stirrer for about 20 minutes at 90° C. while power was applied to the electrodes from a 6 volt power source. The pH of the solution was about 1.8, and the amperage about 1.2 per square inch throughout the plating process. The voltage rose from about 1.5 to about 3.0, and then ceased. Approximately 0.65 pounds of iron were deposited on the carbon cathode.

During electrolysis, about 5.2 pounds of silicon dioxide settled to the bottom of the electrolysis chamber and were drawn off. Thereafter, 2.6 pounds of ammonium hydroxide were added to the solution with constant stirring, which raised the pH to about 6.5. During this reaction, the temperature of the aqueous media rose from about 90° C. to about 107° C., and aluminum hydroxide immediately formed and began precipitating. After about 2 minutes, the reaction was complete, the solution was filtered, and about 3.53 pounds of aluminum hydroxide were recovered therefrom. Upon heating this hydroxide at 900° C., about 2.3 pounds of alumina were formed and recovered.

In summary, this example resulted in recovery of approximately 100% by weight of the silicon dioxide in the starting fly ash, about 65% by weight of the iron, and about 89% by weight of the aluminum, all in substantially pure form. In commercial practice, the filtrates would be recycled, and even higher yields would result.

What is claimed is:
1. A process comprising:
   (a) blending and heating fly ash with water at a temperature in the range of about 90° C. to about 135° C. and a pH in the range of about 11 to about 14 to form an alkaline aqueous blend;
   (b) filtering said alkaline aqueous blend and recovering solids therefrom;
   (c) leaching said solids with hydrochloric or hydrofluoric acid to form dissolved chloride or fluoride compounds comprising iron and aluminum;
   (d) electrolyzing said dissolved chloride or fluoride compounds to plate out at least said iron; and
   (e) separating silicon dioxide as a precipitate from the electrolyzed solution and recovering the electrolyzed solution free of silicon dioxide.

2. The process of claim 1 wherein the fly ash has a pH of less than about 11, and the pH is adjusted in step (a) by adding thereto sodium hydroxide.

3. The process of claim 1 wherein the acid in step (c) is hydrochloric acid.

4. The process of claim 1 wherein the acid in step (c) is hydrofluoric acid.

5. The process of claim 1 wherein said blending and heating are effected at a pH in the range of about 11.5 to about 13.5.

6. The process of claim 1 wherein the acid is hydrochloric, and said leaching is effected at a temperature in the range of about 70° C. to about 90° C., at a pH in the range of about 1.0 to about 2.3, and at a concentration of hydrochloric acid in the range of about 10% to about 20%.

7. The process of claim 1 wherein said electrolyzing is effected at a pH in the range of about 1 to about 3, a temperature in the range of about 70° C. to about 90° C., a direct current voltage in the range of about 1.5 to about 3.0 volts, and an amperage in the range of about 1.2 to about 1.5 amperes per square inch.

8. The process of claim 1 further comprising treating the silicon dioxide-free solution with an alkaline substance to form aluminum hydroxide, and recovering said aluminum hydroxide.

9. The process of claim 8 wherein the treating of the silicon dioxide-free solution is effected at a temperature in the range of about 30° to about 90° C. and a pH in the range of about 6.5 to about 7.5.

10. The process of claim 8 wherein said alkaline substance is selected from hydroxides of ammonium and the alkali and alkaline earth metals.

11. The process of claim 10 wherein said alkaline substance is selected from the group consisting of sodium hydroxide and ammonium hydroxide.

* * * * *